No. 782,602. PATENTED FEB. 14, 1905.
J. DRAENERT.
APPARATUS FOR MAKING BRICKS.
APPLICATION FILED JUNE 2, 1904.
Fig. 1
Section N-N
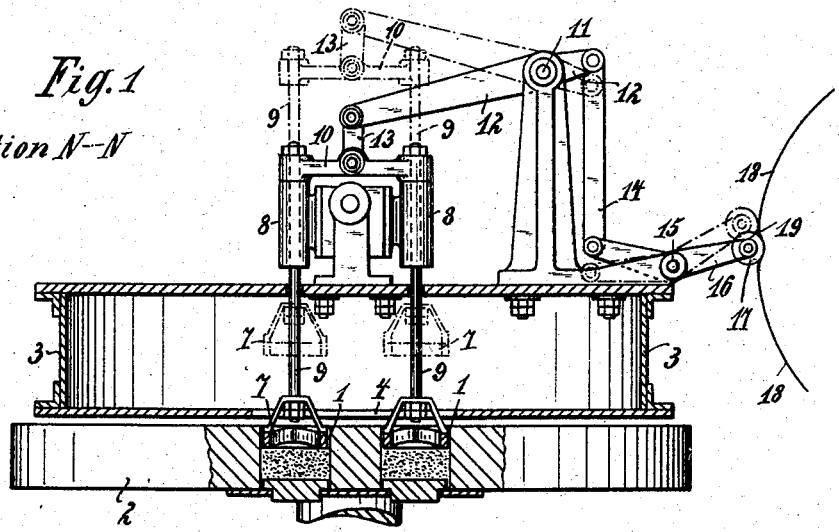
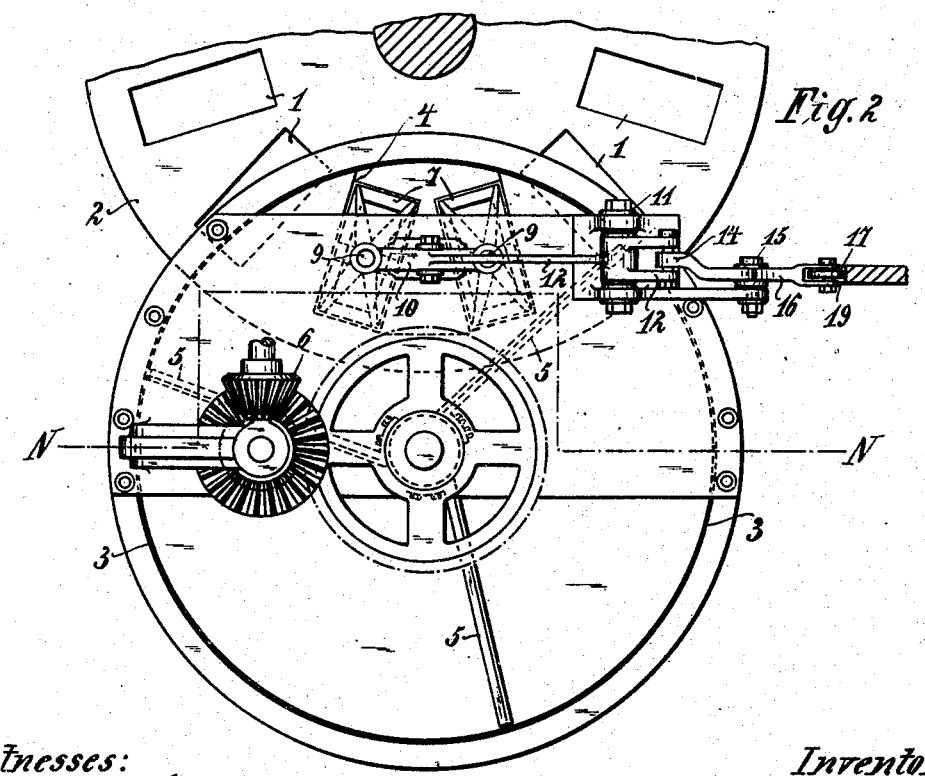
Fig. 2
Witnesses:
George G. Schoenlank
Inventor:
Johannes Draenert
Attorney No. 782,602. Patented February 14, 1905.

UNITED STATES PATENT OFFICE.

JOHANNES DRAENERT, OF EILENBURG, GERMANY.

APPARATUS FOR MAKING BRICKS.

SPECIFICATION forming part of Letters Patent No. 782,602, dated February 14, 1905.

Application filed June 2, 1904. Serial No. 210,794.

*To all whom it may concern:*

Be it known that I, JOHANNES DRAENERT, a citizen of the German Empire, and a resident of Eilenburg, Saxony, Germany, have invented new and useful Apparatus for Making Bricks, of which the following is a description.

The present invention consists of an apparatus for making bricks having exceptionally hard corners and edges, as hereinafter particularly set forth, and pointed out in the claim.

In order to render the present specification easily intelligible, reference is had to the accompanying drawings, in which similar numerals of reference denote similar parts throughout both views.

Figure 1 is an elevation, partly in section, of a press in which the invention may be carried out; and Fig. 2 is a part plan view of Fig. 1.

The press illustrated in the drawings is only one form and is described for the purposes of the present specification only. Any variety of press could be employed, as will be readily understood.

The present press consists of the rotary table 2, having the molds 1 therein and adapted to rotate under the holder 3 for the material. This latter is provided with two outlet-orifices 4 in its bottom, which register with two molds 1 of the table 2 when the latter has been intermittently turned into position. The holder has, furthermore, the feed-wings 5, which are rotated therein by means of gearing 6 and which sweep the material into the molds through the outlets 4. The dies 7 in the form of frames which fit into the molds 1, being vertically reciprocated through the outlets 4, are carried by rods 9, connected up by a cross-head 8 and suitably guided in the frame of the apparatus. The cross-head 8 is linked by a link 13 to a double-arm lever 12, supported in a standard on the pivot 11 and having a connecting-rod 14 linked to its opposite end, by means of which it is connected to one arm of a lever 16, adapted to rock on the pivot 15. The free end of lever 16 carries a roll 17, which runs on the edge of a cam-disk 18. This disk is provided with a recess 19, and each time the recess comes round the roll 17 passes into it and the dies fall by gravity into the molds thereunder.

The operation takes place in the following manner: The cam-disk 19 and the gears 6 are rotated from any suitable source of power and so timed that one of the feed-wings fills the material into the two molds. Then the recess 19 comes round and allows the dies to fall and stamp down the edges of the material in the said molds. Then the said dies are immediately raised again, the recess 19 being very short, and the next feed-wing 5 refills the two molds, when they pass on to the regular press, under which they are compressed to the desired degree, two further molds coming under the dies 7 to be filled and refilled, as will be readily understood.

I claim as my invention—

An apparatus for making bricks having very hard corners and edges consisting of a holder for the material, a table having a series of molds therein, to rotate under said holder, wings and outlets in the said holder, through which the material is fed to the molds, reciprocatory frame-shaped dies to fit into said molds through said outlets, and means for reciprocating said dies and rotating said wings to first fill the mold, then stamp down the edges and then refill the mold substantially as described.

In witness whereof I have hereunto set my hand in presence of two witnesses.

JOHANNES DRAENERT.

Witnesses:
  MORITZ SPREER,
  RUDOLPH FRICKE.